United States Patent
Han et al.

(10) Patent No.: US 8,060,126 B2
(45) Date of Patent: *Nov. 15, 2011

(54) METHOD OF ALLOCATING TRANSMISSION POWER BASED ON SYMBOL ERROR RATE FOR ORTHOGONAL SPACE-TIME BLOCK CODES IN A DISTRIBUTED WIRELESS COMMUNICATION SYSTEM

(75) Inventors: Shuangfeng Han, Suwon-si (KR); Seong-Taek Hwang, Pyeongtaek-si (KR); Byung-Jik Kim, Seongnam-si (KR); Han-Lim Lee, Seoul (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 957 days.

This patent is subject to a terminal disclaimer.

(21) Appl. No.: 12/018,887

(22) Filed: Jan. 24, 2008

(65) Prior Publication Data

US 2008/0182611 A1 Jul. 31, 2008

(30) Foreign Application Priority Data

Jan. 25, 2007 (KR) ........................ 10-2007-0008095

(51) Int. Cl.
*H04B 7/00* (2006.01)
*H04B 1/66* (2006.01)
*H04C 7/02* (2006.01)

(52) U.S. Cl. ........... 455/522; 455/101; 455/69; 455/102

(58) Field of Classification Search .................. 455/525, 455/524, 101, 562.1, 522, 102

See application file for complete search history.

(56) References Cited

U.S. PATENT DOCUMENTS

| | | | |
|---|---|---|---|
| 7,522,673 B2 * | 4/2009 | Giannakis et al. | 375/267 |
| 7,904,106 B2 * | 3/2011 | Han et al. | 455/522 |
| 2001/0033622 A1 * | 10/2001 | Jongren et al. | 375/267 |
| 2004/0066761 A1 * | 4/2004 | Giannakis et al. | 370/329 |
| 2006/0067242 A1 | 3/2006 | Bi et al. | |
| 2008/0117961 A1 * | 5/2008 | Han et al. | 375/227 |

FOREIGN PATENT DOCUMENTS

| | | |
|---|---|---|
| KR | 2003-87296 | 11/2003 |
| KR | 2005-20133 | 3/2005 |
| KR | 2006-063478 | 6/2006 |
| KR | 2006-135155 | 12/2006 |
| WO | WO 00/72464 | 11/2000 |

OTHER PUBLICATIONS

Zhou, Shengli, et al.; "Optimal Transmitter Eigen-Beamforming and Space-Time Block Coding Based on Channel Mean Feedback;" IEEE Transactions on Signal Processing, vol. 50, No. 10; Oct. 2002.

* cited by examiner

Primary Examiner — Tilahun B Gesesse
(74) Attorney, Agent, or Firm — Cha & Reiter, LLC (57) ABSTRACT

Disclosed is a device for allocating transmission power using a symbol error rate (SER) for orthogonal space-time block codes (OSTBC) in a wireless communication system. The device includes: a plurality of antennas, which are distributed geographically and independently linked to a central processing unit; a receiver to select an optimum subset of the SER performance, using a preset power allocation to each of available antenna subset combinations, and sending the selected subset to a transmitter; and a central processing unit to allocate power by applying an OSTBC symbol having a unit average power to the optimum subset from the receiver.

6 Claims, 4 Drawing Sheets

METHOD OF ALLOCATING TRANSMISSION POWER BASED ON SYMBOL ERROR RATE FOR ORTHOGONAL SPACE-TIME BLOCK CODES IN A DISTRIBUTED WIRELESS COMMUNICATION SYSTEM

CLAIM OF PRIORITY

This application claims priority to application entitled "Method Of Allocating Transmission Power Based On Symbol Error Rate For Orthogonal Space-Time Block Codes In Distributed Wireless Communication System," filed with the Korean Intellectual Property Office on Jan. 25, 2007 and assigned Serial No. 2007-8095, the contents of which are incorporated herein by reference.

BACKGROUND OF THE INVENTION

1. Field of the Invention

The present invention relates to a distributed input/output wireless communication system using space-time coding techniques, and more particularly to a method of allocating transmission power based on a symbol error rate for orthogonal space-time block codes (OSTBC).

2. Description of the Related Art

In wireless technology, spatial multiplexing and space-time coding techniques have been relatively recently developed. A certain type of space-time coding, which is referred to as MIMO for multiple-input multiple-output, uses multiple antennas for receiving/transmitting a signal Each of the multiple radio waves can be independently transmitted within a common frequency range for a common time.

In general, MIMO technology generates parallel spatial data streams within a common frequency bandwidth, which is based on using spatially separated antennas. In the transmission of radio waves (even if individual signals are transmitted within a common frequency) statistically independent (i.e. effectively separated) multiple communication channels can be generated by division and demodulation at a receiver. A standard wireless communication system prohibits multipath (i.e. multiple signals that are delayed in time, adjusted in amplitude/phase, and have a common frequency). In contrast, MIMO can depend on multipath signals of little correlation (or weak correlation). Consequently, MIMO can achieve an improved signal-to-noise ratio and higher throughput within a proper frequency bandwidth.

In a certain application of a MIMO-type technology, theoretical results provided by the below mentioned references [1] and [2] have proved distributed antennas (DAs) to be superior to co-located multiple-input multiple-output (C-MIMO) channels in terms of capacity. However, thorough research on a method of taking advantage of the capacity of the DAs has not been done yet. A concept of a distributed wireless communication system (DWCS) is proposed in the below mentioned reference [3]. The system is expected to greatly improve system capacity because the system can process a transmission and receiving signal at once.

OSTBC (See reference [4]) of various space-time codes is very useful for an actual system arrangement due to a simple process of coding and decoding. In future wireless communication, a bottleneck situation may occur in transmission of downlink data. Thus it is important to design optimum downlink OSTBC based on estimation of channel state information (CSI) of a particular transmitter. However, in an OSTCB scheme on DAs, allocation of transmission power is very important because large-scale fading of each of the DAs may be greatly changed.

Figure 1:
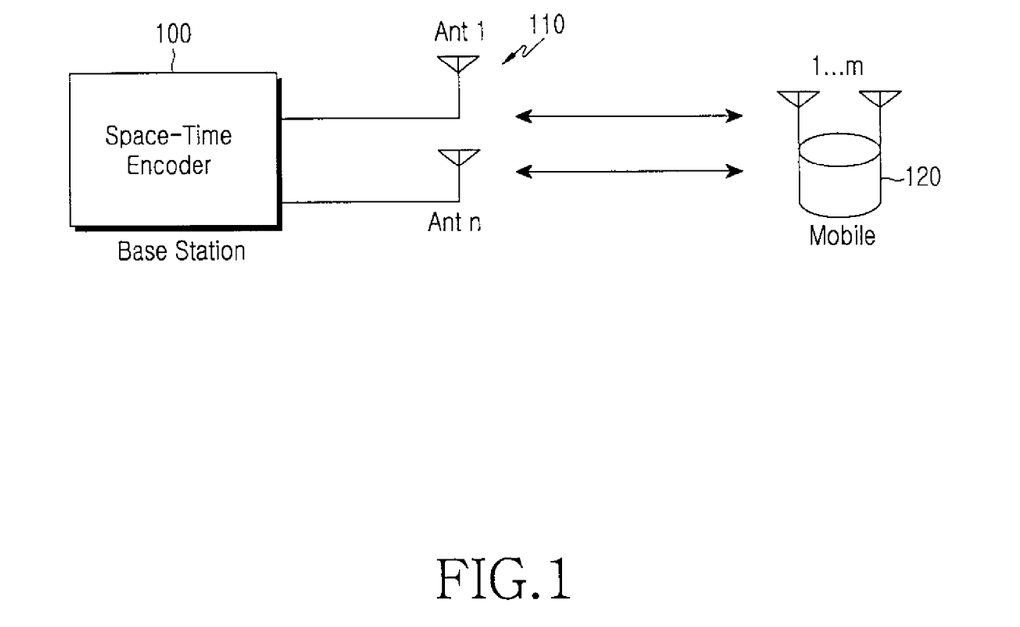
FIG. 1 is a block diagram illustrating a system for transmitting orthogonal space-time block codes (OSTBC) on conventional co-located multiple-input multiple-output (C-MIMO) channels.

FIG. 1 is a block diagram illustrating a system for transmitting OSTBC on conventional C-MIMO channels. A data symbol transmitted from a transmitter (i.e. a base station) is modulated by a designated modulation process. It is input to a space-time encoder 100, encoded in space-time, and transmitted to a receiver (i.e. a mobile terminal) 120 through multiple co-located transmitting antennas 110. Here, the receiver 120 has m receiving antennas.

As shown in the FIG. 1, the present research on OSTBC is mainly limited to C-MIMO channels. In this case, open-loop transmission (the same power allocation) is mainly selected, because large-scale fading of each of transmitting antennas is almost the same.

However, this process has a number of limitations. For example, macro diversity cannot be utilized due to co-location of transmitting antennas and an average access distance is much greater than DAs.

SUMMARY OF THE INVENTION

The present invention has been made to solve the above-mentioned problems occurring in the prior art. The present invention provides a method of providing a power allocation scheme in a distributed wireless communication system (DWCS), so as to minimize a symbol error rate (SER) for uncoded orthogonal space-time block codes (OSTBC).

In accordance with an aspect of the present invention, there is provided a device for allocating transmission power using a symbol error rate (SER) for orthogonal space-time block codes (OSTBC) in a wireless communication system. The device includes: a plurality of antennas, which are distributed, geographically, for example randomly, and independently linked to a central processing unit; a receiver to select an optimum subset of the SER performance, using a preset power allocation to each of available antenna subset combinations, and sending the selected subset to a transmitter; and a central processing unit to allocate power by applying an OSTBC symbol having a unit average power to the optimum subset feedbacked from the receiver.

In accordance with another aspect of the present invention, there is provided a method of allocating transmission power using a SER for OSTBC in a wireless communication system. The system includes a plurality of antennas distributed geographically. The method includes the steps of: setting available antenna subset combinations by a receiver; selecting an optimum subset of the SER performance, using a preset power allocation to each of the antenna subsets, and sending the selected subset to a transmitter by the receiver; and allocating power by applying an OSTBC symbol having a unit average power to the optimum subset from the receiver by a transmitter.

BRIEF DESCRIPTION OF THE DRAWINGS

The present invention will be more apparent from the following detailed description taken in conjunction with the accompanying drawings, in which.

DETAILED DESCRIPTION OF THE INVENTION

Hereinafter, embodiments of the present invention will be described in detail with reference to the accompanying drawings. For the purposes of clarity and simplicity, a detailed description of known functions and configurations incorporated herein is omitted to avoid making the subject matter of the present invention unclear.

Based on information of large-scale fading (path loss and shadowing), the present invention provides a scheme of allocating transmission power. The scheme uses an adaptive symbol error rate (SER) for orthogonal space-time block codes (OSTBC) in flat Nakagami fading channels in a distributed wireless communication system (DWCS). A power allocation scheme according to the present invention is executed at a receiver. The result of the power allocation is sent or feed-backed to a transmitter through a low-speed feedback channel.

The distributed antennas (Das) of a base station are geographically diversified. An OSTBC symbol is transmitted to the DAs and thus transmission diversity is achieved.

A subset of transmitting antennas includes an arbitrary combination of DAs. A power allocation scheme in the present invention is to select the best subset which is optimized for a power allocation.

The present invention provides a sub-optimal power allocation scheme for an arbitrary subset of transmitting antennas. The transmission power is allocated by using "a water pouring algorithm" (PAS1), or simply in proportion to a Nakagami fading parameter 'm' of each DA (i.e. PAS2). This power allocation scheme is very close to an optimum power allocation at a high transmission power level.

In the present invention, as a subset of antennas is selected based on a sub-optimal power allocation for each antenna subset. The subset having the best SER performance is selected. Here, performance of the subset is close to optimum performance at any transmission power level.

Power allocation is executed at a receiver, and the result of the power allocation is feedbacked to a transmitter. A feedback channel has a low speed, because power allocation depends on large-scale channel fading. When the large-scale channel fading is changed, the receiver updates the result of the power allocation, and feedbacks the result to the transmitter.

[System Model]

Figure 2:
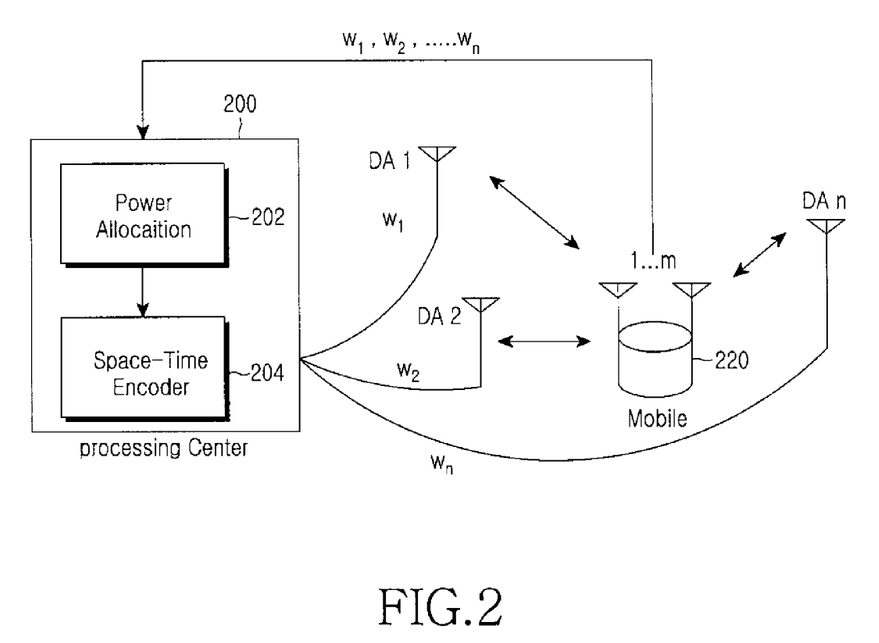
FIG. 2 is a block diagram illustrating a system for transmitting OSTBC in a distributed wireless communication system (DWCS) according to a first embodiment of the present invention.

FIG. 2 is a block diagram illustrating a system for transmitting OSTBC in a distributed wireless communication system (DWCS) according to a first embodiment of the present invention, wherein a downlink single user (n, m) DWCS is considered. As shown in FIG. 2, n DAs (DA1, DA2, ... DAn) are randomly distributed geographically, and a receiver, such as a mobile terminal 220, has m antennas. Every DA is independently linked to a central processing unit 200 in which transmission/receiving signals of the DAs are processed. Generally, macroscopic/microscopic fading of different DAs occurs independently of each other. Fading of receiving antennas is also assumed to be independent of each other. Transmission diversity is achieved by applying OSTBC to the DAs.

First, a power allocation unit 202 of a central processing unit 200 selects an optimum subset of transmitting antennas (i.e. a DA combination), wherein the optimum subset has an optimum power allocation. Then, a space-time encoder 204 generates an OSTBC symbol having a unit average power, and multiplies it by a power allocation matrix P in advance of transmission. Therefore, a diagonal power allocation matrix P can be expressed as follows: $P = \text{diag}(\sqrt{w_1}, \sqrt{w_2}, \ldots, \sqrt{w_n})$ wherein $w_j$ ($j=1, \ldots, n$) represents a weight of a power allocation for the jth DA, and $$\sum_{j=1}^{l} w_j = 1.$$

It is assumed that a channel frequency is flat, and a receiver can use complete channel state information (CSI). A valid input/output relation can be expressed as the following equation:

$$y = \sqrt{P_0} HPx + n \quad (1)$$

wherein y and x denote a receiving and a transmission vector, n denotes a noise vector having an independent, identically distributed (I.I.D) complex $N(0, \sigma^2)$ entry, and $P_0$ denotes an overall average transmission power. Therefore, $P_0/\sigma^2$ denotes a transmit power-to-receive noise ratio (TSNR), and is expressed as $\rho$. A channel gain from the jth transmission DA to the kth receiver antenna is $$h_{j,k} = \beta_{j,k} e^{i\theta_{j,k}},$$

in which $j=1, \ldots, n$, $k=1, \ldots, m$, and $\theta_{j,k}$ is uniformly distributed within a range of $[0.2\pi]$. $\theta_{j,k}$ is a Nakagami-distributed random variable, and a probability density function (PDF) is expressed as the following equation:

$$f_{\beta_{j,k}}(x) = \frac{2}{\Gamma(m_{j,k})} \left(\frac{m_{j,k}}{\Omega_{j,k}}\right)^m x^{2m_{j,k}-1} e^{-\frac{m_{j,k}}{\Omega_{j,k}} x^3} \quad (2)$$

wherein $\Omega_{j,k} = E'\beta_{j,k}^{2t}$ denotes an average power of $h_{j,k}$, and $m_{j,k}$ denotes a relevant Nakagami fading parameter. Usually, $m_{j,k} \geq \frac{1}{2}$, and this indicates the severity of fading. It must be noticed that $\Omega_{j,k}$ ($j=1, \ldots, n$) is large-scale fading of the jth DA. It is assumed that $\Omega_{j,1} = \ldots = \Omega_{j,m} = \Omega_j$ because receiving antennas are co-located. Also, it is assumed that $m_{j,1} = \ldots = m_{j,m} = m_j$. In a usual point-to-point multiple-input multiple-output (MIMO) channel, every $\Omega_j$ ($j=1, \ldots, n$) is assumed to be the same because transmitting antennas are co-located. However, in a DWCS according to the present invention, large-scale fading may be greatly changed due to geographical distribution.

In the present invention, a subset of transmitting antennas includes an arbitrary combination of DAs. Here, the total number of subsets is $2^n-1$, and each subset is expressed as $A_1, \ldots, A_{2^n-1}$. For example, a subset $A_n$ is assumed to include n DAs. A rate of OSTBC is expressed as r, and $r=n_s/T$ in which independent data streams of $n_s$ are transmitted during F successive symbol time intervals. For the sake of convenience, a subset $A_k$ is assumed to have only one rate $r_k$ ($k=1, \ldots 2^n-1$) because rates of different antenna subsets may be different from each other. Different symbol constellations according to each antenna subset may be used to transmit the data streams at the same data rate. In the present invention, a constellation point is considered as $q_k$ of quadrature amplitude modulation (QAM) or as a phase shift keying (PSK) symbol of a subset $A_k$. For example, at four antenna subsets using a ¾ rate of QSTBC, when a data transmission rate is 3 bit/s, a modulation type may be 16 QAM, or 16 PSK.

[Derivation of SER Expression for M-QAM and M-PSK]

For an uncoded OSTBC scheme in flat Nakagami fading channels, a SER becomes a useful measure of performance. Therefore the present invention provides a power allocation scheme for minimizing SER and optimizing transmission. When modulation is assumed to be $M_i$-QAM or $M_i$-PSK, a SER expression of a subset $A_n$ having a rate of $r_n$ is derived as follows.

A signal-to-noise ratio (SNR) for detection is derived as the following equation:

$$\eta = \|HP\|_F^2 \rho = \sum_{j=1}^{n} \sum_{k=1}^{m} \beta_{j,k}^2 w_j \rho = \sum_{j=1}^{n} \sum_{k=1}^{m} \eta_{j,k} \quad (3)$$

wherein $\eta_{j,k}$ denotes a gamma distributed random variable, here, a PDF corresponds to the following equation.

$$f_{\eta_j}(x) = \frac{1}{\Gamma(m_j)} \left(\frac{m_j}{\Omega_j w_j q_{j} \rho}\right)^{m_j} x^{m_j - 1} e^{-\frac{m_j}{\Omega_j w_j q_j \rho} x} \quad (4)$$

A moment generation function (MGF) of $\eta$ is derived as the following equation:

$$\Phi_\eta(s) = \prod_{j=1}^{n} \prod_{k=1}^{m} \Phi_{\eta_{j,k}}(s) = \prod_{j=1}^{n} (1 - si\Omega_j w_j \rho / m_j)^{-mm} \quad (5)$$

$$= \sum_{j=1}^{n} \sum_{k=1}^{mm} T_{j,k} (1 - si\Omega_j w_j \rho / m_j)^{-k}$$

$$= \sum_{j=1}^{n} \sum_{k=1}^{mm} T_{j,k} \Phi_{j,k}$$

wherein a coefficient, $q_{j,k}$, can be obtained by performing a partial fraction.

$$T_{j,k} = \frac{(-i\Omega_j w_j \rho / m_j)^{-(mm-k)}}{(m_j - k)!} \frac{\partial^{mm-k}}{\partial s^{mm-k}} \left(\prod_{u=1, u \neq j}^{n} \left(1 - \frac{si\Omega_u w_u \rho}{m_u}\right)^{-mm}\right) \bigg|_{s=\frac{m}{i\Omega w \rho}} \quad (6)$$

Therefore, a PDF of $\eta$ can be obtained by an inverse transform into $\Phi_q(s)$.

$$f_\eta(x) = \sum_{j=1}^{n} \sum_{k=1}^{mm} \frac{1}{\Gamma(k)} T_{j,k} (\Omega_j w_j \rho / m_j)^{-k} x^{k-1} e^{-xm/\Omega_j w \rho} \quad (7)$$

As described in the reference [5], when a SER expression having a more systematic closed-form of a coefficient of $M_n$-QAM and $M_n$-PSK for OSTBC is derived on co-located multiple-input multiple-output (C-MIMO) fading channels, a SER for OSTBC may correspond to the following equations:

$$P_{e,M_n QAM} = \sum_{j=1}^{n} \sum_{k=1}^{mm} T_{j,k} \left(\frac{4\delta_n}{\pi} \int_0^{\pi/2} \Phi_\eta\left(-\frac{g_{M_n QAM}}{\sin^2 \theta}\right) d\theta - \frac{4\delta_n^2}{\pi} \int_0^{\pi/4} \Phi_\eta\left(-\frac{g_{M_n QAM}}{\sin^2 \theta}\right) d\theta\right) \quad (8)$$

$$= \sum_{j=1}^{n} \sum_{k=1}^{mm} T_{j,k} T_{j,k} \left(\Phi_\eta(-g_{M_n QAM}) \frac{2\delta_n}{\sqrt{\pi}} \frac{\Gamma(k+1/2)}{\Gamma(k+1)} {}_2F_1\right.$$

$$\left(k, 1/2, k+1 \frac{1}{1 + g_{M_n QAM} \Omega_j w_j \rho / m_j}\right) - $$

$$\sum_{j=1}^{n} \sum_{k=1}^{mm} T_{j,k} \left(\Phi_\eta(-2g_{M_n QAM}) \frac{2\delta_n^2}{\pi(2k+1)} F_1\right.$$

$$\left(1, k, 1, k+3/2; \frac{m_j + g_{M_n QAM} \Omega_j w_j \rho}{m_j + 2g_{M_n QAM} \Omega_j w_j \rho}, 1/2\right)\right)$$

$$P_{e,M_n PSK} = \sum_{j=1}^{n} \sum_{k=1}^{mm} T_{j,k} \left(\frac{1}{\pi} \int_0^{\pi/2} \Phi_\eta\left(-\frac{g_{M_n PSK}}{\sin^2 \theta}\right) d\theta + \frac{1}{\pi} \int_{\pi/2}^{(M_n-1)\pi/M} \Phi_\eta\left(-\frac{g_{M_n PSK}}{\sin^2 \theta}\right) d\theta\right) \quad (9)$$

$$= \sum_{j=1}^{n} \sum_{k=1}^{mm} T_{j,k} T_{j,k} \left(\Phi_\eta(-g_{M_n PSK}) \frac{1}{2\sqrt{\pi}} \frac{\Gamma(k+1/2)}{\Gamma(k+1)} {}_2F_1\right.$$

$$\left(k, 1/2, k+1 \frac{1}{1 + g_{M_n PSK} \Omega_j w_j \rho / m_j}\right) + $$

$$\sum_{j=1}^{n} \sum_{k=1}^{mm} T_{j,k} \left(\Phi_\eta(-2g_{M_n PSK}) \sqrt{\frac{1 - g_{M_n PSK}}{\pi}} F_1\right.$$

$$\left(\frac{1}{2}, k, \frac{1}{2} - k, \frac{3}{2}; \frac{1 - g_{M_n PSK}}{1 + g_{M_n PSK} \Omega_j w_j \rho / m_j}, 1 - g_{M_n PSK}\right)\right)$$

wherein $$F_1(a, b_1, b_2; c, x, y) = \sum_{n=0}^{\infty} \sum_{k=0}^{\infty} (a)_{n+k} (b_1)_n (b_2)_k x^n y^k / ((c)_{n+k} n! k!)$$

wherein denotes an Appell hypergeometric function, $$(a)_n = \Gamma(a+n)/\Gamma(a),$$

and $${}_2F_1(a, b, c, x) = \sum_{n=0}^{\infty} (a)_n (b)_n x^n / ((c)_n n!)$$

denotes a Gauss hypergeometric function, $$g_{M_i QAM} = \frac{1.5}{(M_i - 1)}, \delta_i = 1 - \frac{1}{\sqrt{M_i}}, g_{M_i PSK} = \sin^2\left(\frac{\pi}{M_i}\right).$$

Also, a SER expression of OSTBC transmitted to another arbitrary subset can be obtained. The present invention provides a scheme that minimizes a SER of each subset through an optimum power allocation to each subset. It also selects a subset having the best SER performance for transmission.

Here, because it is difficult to directly optimize a SER, the present invention provides the following sub-optimal scheme.

[Sub-Optimal Power Allocation for MQAM Symbol]

A SER for OSTBC, which has a MQAM constellation, corresponds to the following equation.

$$P_{MQAM} = 1 - \left(1 - \int_0^\infty 2\left(1 - \frac{1}{\sqrt{M}}\right)Q\left(\sqrt{\frac{3}{M-1}}\,x\right)f_\eta(x)\,dx\right)^2 \quad (10)$$

According to the present invention, when an optimum subset for OSTBC transmission is unknown in a given transmission scenario, with no loss of generality, it is assumed that a subset $A_g$ ($1 \leq g \leq 2^j - 1$) having an optimum power allocation weight, $w_1, \ldots, W_g$ (some of them may be zero), is an optimum subset. By applying a Chernoff bound to a Q function, $Q(x) \leq \exp(-x^2/2)$, the upper bound of a SER of such a combining scheme (including a MgQAM symbol) can be expressed as the following equation.

$$P_{M_nQAM} \leq 1 - \left(1 - 2\left(1 - \frac{1}{\sqrt{M_g}}\right)\int_0^\infty e^{-\frac{3}{2(M-1)}x} f_n(x)\,dx\right)^2 = \quad (11)$$

$$1 - \left(1 - 2\left(1 - \frac{1}{\sqrt{M_g}}\right)\prod_{j=1}^{g}\left(1 + \frac{3}{2(M_g-1)}\Omega_j w_j \rho/m_j\right)^{mm_j}\right)^2 = P_{ub1}^A$$

In the present invention, minimizing $P_{w1}^A$ by an optimum transmission power allocation corresponds to optimization such as the following equation.

$$w^* = \text{argmax} \prod_{j=1}^{g}\left(1 + \frac{3}{2(M_g-1)}\Omega_j w_j \rho/m_j\right)^{mm_j} \quad (12)$$

A maximal expression corresponds to a concave function by a variable $w_j$, and maximized by using a Lagrangian function. A function F is defined as the following equation.

$$F(w_1, w_2 \ldots w_g, u) = \quad (13)$$

$$\sum_{j=1}^{g} mm_j \log\left(1 + \frac{3}{2(M_g-1)}\Omega_j w_j \rho/m_j\right) - u\left(\sum_{j=1}^{g} w_j - 1\right)$$

When $$Q_j = 2(M_g - 1)m_j\, 3\Omega_j q_j \rho,\, w'_j (j = 1, \ldots, g)$$

can be obtained by repeatedly solving the equation through "a water pouring algorithm" as the following equation.

$$\frac{\partial F}{w_j} = mm_j(Q_j + w_j)^{-1} - u = 0,\, j = 1, \ldots, g \quad (14)$$

In the present invention, such a process is referred to as a first power allocation scheme (PAS1). In a high TSNR region, a power allocation weight can be expressed as the following equation.

$$w_j^* = m_j \Big/ \sum_{j=1}^{g} m_j,\, (j = 1, \ldots, g.) \quad (15)$$

In the present invention, a scheme for applying the equation 15 at a certain transmission power level is referred to as a second power allocation scheme (PAS2).

[Sub-Optimal Power Allocation for MPSK Symbol]

In a subset $A_g$, a SER for OSTBC, which has a MPSK symbol, can be expressed as the following equation.

$$P_{M_g PSK} = \quad (16)$$

$$\int_0^\infty \left(2Q\left(\sqrt{2x}\sin\frac{\pi}{M_g}\right) - \frac{1}{\pi}\int_{\frac{\pi}{2}\frac{\pi}{M_g}}^{\frac{\pi}{2}} e^{-x\left(\sin\frac{\pi}{M_g}\right)/\cos^2\theta}\,d\theta\right)f_\eta(x)\,dx$$

When $Mg \geq 4$, the equation 16 can be approximated to $$P_{M_g PSK} \approx \int_0^\infty 2Q\left(\sqrt{2x}\sin(\pi/M_g)\right)f_\eta(x)\,dx$$

In additive white Gaussian noise (AWGN) channels, a SER of BPSK/QPSK can be approximated to the following equations.

$$P_{BPSK} \approx \int_0^\infty Q(\sqrt{2x})f_\eta(x)\,dx \quad (17)$$

$$P_{QPSK} \approx \int_0^\infty Q(\sqrt{x})f_\eta(x)\,dx \quad (18)$$

By applying a Chernoff bound to a Q function, the upper bound of a SER can be derived as the following equations.

$$P_{M_g PSK} \approx \int_0^\infty Q(\sqrt{2x}\sin(\pi/M_g))f_\eta(x)\,dx \leq \quad (19)$$

$$2\int_0^\infty e^{-x\sin^2(\pi/M_g)}f_\eta(x)\,dx$$

$$= 2\Phi_\eta(-\sin^2(\pi/M_g))$$

$$= 2\prod_{j=1}^{g}(1+\sin^2(\pi/M_g)\Omega_j w_j \rho/m_j)^{-mm}$$

$$P_{BPSK} \approx \int_0^\infty Q(\sqrt{2x})f_\eta(x)\,dx \leq \int_0^\infty e^{-x}f_\eta(x)\,dx \quad (20)$$

$$= \Phi_\eta(-1)$$

$$= \prod_{j=1}^{g}(1+\Omega_j w_j \rho/m_j)^{-mm}$$

$$P_{QPSK} \approx \frac{1}{2}\int_0^\infty Q(\sqrt{x})f_\eta(x)\,dx \leq \frac{1}{2}\int_0^\infty e^{-\frac{1}{2}x}f_\eta(x)\,dx \quad (21)$$

$$= \frac{1}{2}\Phi_\eta\left(-\frac{1}{2}\right)$$

$$= \frac{1}{2}\prod_{j=1}^{g}\left(1+\frac{1}{2}\Omega_j w_j \rho/m_j\right)^{-mm_j}$$

In the same manner, a sub-optimal power allocation weight MgPSK ($M_g>4$) can be obtained by a Lagrangian function, as the equation 14, in which $Q_j=m_j\cdot\sin^2(\pi M_g)\Omega_j w_j q_j\rho$, $m_j\Omega_j w_j q_j\rho$ and $2m_j\Omega_j w_j q_j\rho$ are applied for BPSK/QPSK constellations. Also, it must be noticed that a power allocation in a high TSNR region corresponds to the equation 15.

[Selection of Antenna Subset by Using Sub-optimal Power Allocation Scheme]

By substituting the power allocation weight obtained from the equations 14 and 15 into a SER expression, a sub-optimal SER $P_i$ of a MQAM/MPSK symbol can be computed. By applying the above method to any available optimum antenna subsets, a similar sub-optimal scheme of a power allocation can be obtained in the same manner of the PAS1 and the PAS2.

Figure 3:
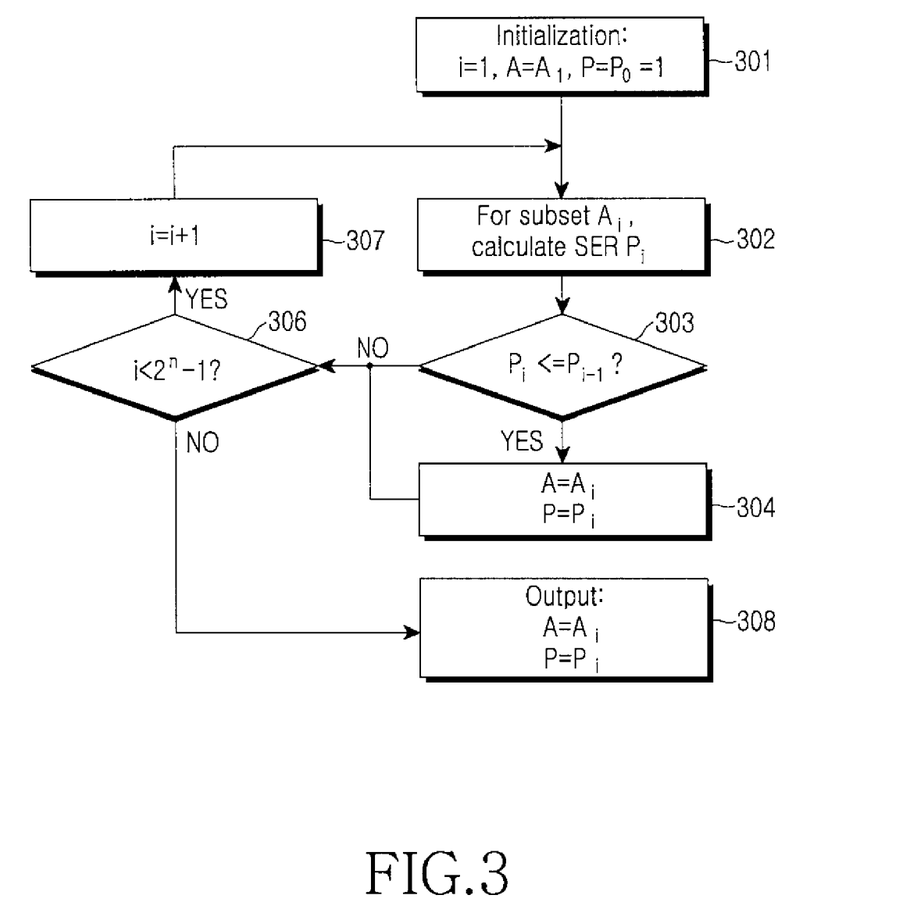
FIG. 3 is a flow diagram illustrating an adaptive process for allocating transmission power for OSTBC in a DWCS according to a first embodiment of the present invention.

FIG. 3 is a flow diagram illustrating an adaptive process for allocating transmission power for OSTBC in a DWCS according to a first embodiment of the present invention. Hereinafter, an optimum power-allocation process according to the present invention will be described with reference to FIG. 3.

First, in step 301, perform initialization. That is, it is set that i=1, $A=A_i$ and $P=P_0=1$, in which A represents an optimum antenna subset, and P represents a sub-optimal SER. In step 302, using a sub-optimal power-allocation scheme such as the equations 14 and 15, compute a sub-optimal SER $P_i$ of a subset $A_i$. In step 303, check whether or not the computed SER $P_i \leq P_{i-1}$. Then, in step 304, set $A=A_i$ and $P=P_i$ when $P_i \leq P_{i-1}$. According to the process, it is possible to check the most optimum SER (including the lowest value) from every SER per subset, and the corresponding subset. In step 305, check whether or not $i<2^n-1$. When $i<2^n-1$, go back to the step 302 and repeatedly perform a SER computation of the corresponding subset after i=i+1 in step 306. Otherwise, proceed to step 307, finish the program and output A and B.

[Numerical Results]

In order to check the performance of the scheme according to the present invention, for example, a (2,1) DA topology (i.e. two DAs and one receiving antenna) is considered, in which fixed large-scale fading includes $\Omega_1=0.1$ and $\omega_2=1$. A desired data rate is 2 bits/s. An antenna subset includes $A_1$ (DA 1), $A_2$ (DA 2) and $A_3$ (both DA 1 and DA 2). OSTBC of a maximum rate (rate 1) is transmitted to $A_3$ having a QPSK symbol. A modulation type of $A_1$ and $A_2$ is also QPSK.

Figure 4:
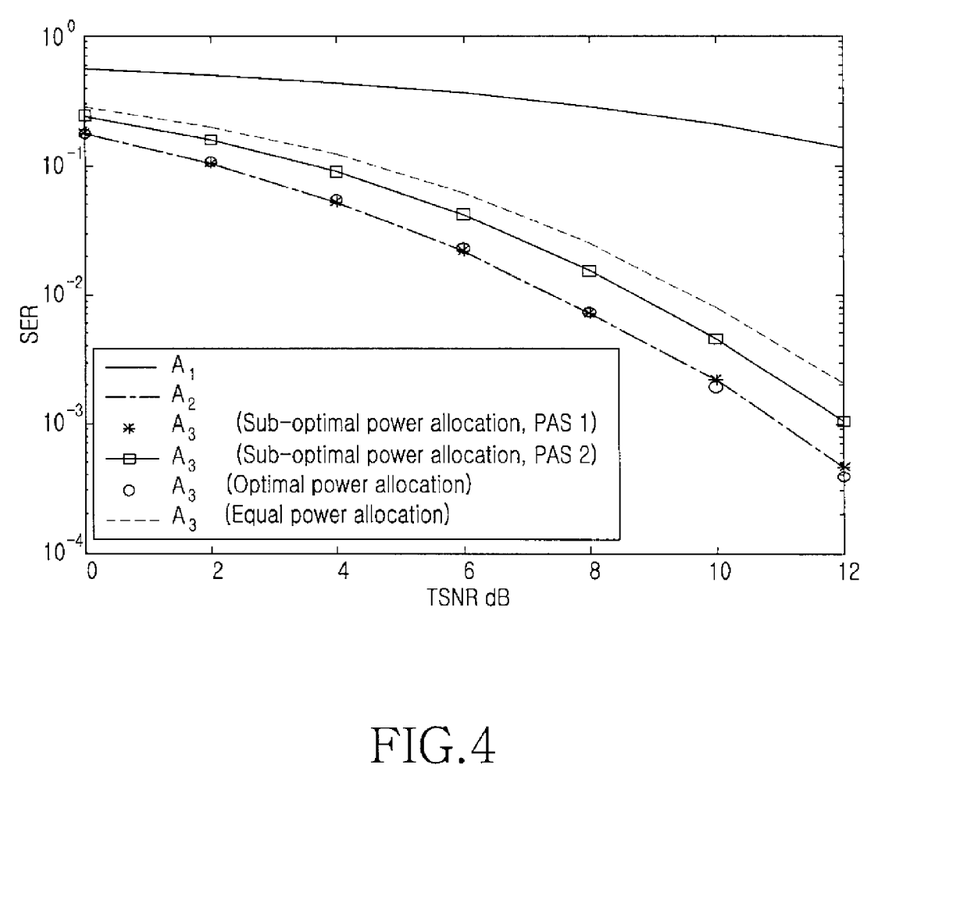
FIG. 4 is a performance characteristics graph illustrating an adaptive process for allocating transmission power for OSTBC in a DWCS according to a first embodiment of the present invention.

FIG. 4 illustrates SER performance of $A_1, A_2, A_3$ wherein a sub-optimal power allocation (PAS1 and PAS2) is applied. An equal power allocation is applied to $A_3$ An optimal power allocation (obtained by numerical optimization) is applied to $A_3$. As shown in FIG. 4, in the TSNR range of 0~12 dB, subset $A_2$ has the best performance. For the selection of an antenna subset, the performance of a PAS1 or a PAS2 is closest to optimum performance.

As shown in FIG. 4, an antenna, which is selected according to the key optimal power allocation scheme of the present invention, has a prominent of performance advantage. That is, in comparison with $A_3$ to which an equal power allocation is applied, transmission power of $A_2$ at a SER of $10^{-2}$ is reduced by 2 dB. In comparison with $A_1$, transmission power of $A_2$ at a SER of $10^{-2}$ is reduced by more than 6 dB.

As described above, transmission power allocation is performed based on a SER for OSTBC in a DWCS, according to a first embodiment of the present invention.

The present invention provides an adaptive sub-optimal power-allocation scheme at a receiver for OSTBC in flat Nakagami fading channels of a DWCS, so as to minimize a SER of a MQAM/MPSK symbol. When information of large-scale fading is changed, a power allocation may be changed accordingly.

In the present invention, because large-scale fading changes with a long time scale, the large-scale fading is very restrictive for use as a feedback. Also, a very simple but effective sub-optimal power-allocation scheme is provided, which is correct in the high transmission power area.

For selection of an antenna, the performance according to the present invention has proved to be closest to optimum performance at any transmission power level. In comparison to the same power-allocation scheme, according to the present invention, it is possible to get a prominent performance gain.

In the present invention, it is possible to get a macro diversity gain and a maximum diversity gain by an OSTBC scheme of adaptively allocating transmission power. The scheme according to the present invention is expected to be widely applied to a 3G or a 4G wireless communication system.

While the invention has been shown and described with reference to certain exemplary embodiments thereof, it will be understood by those skilled in the art that various changes in form and details may be made therein without departing from the spirit and scope of the invention as defined by the appended claims.

REFERENCES

[1] W. Roh and A. Paulraj, "MIMO channel capacity for the distributed antenna systems," in *Proc. IEEE VTC'02*, vol. 2, pp. 706709, 2002.

[2] H. Zhuang, L. Dai, L. Xiao and Y. Yao, "Spectral efficiency of distributed antenna system with random antenna layout," *Electronics Letters, vol.* 39, no. 6, pp. 495-496, 2003.

[3] S. Zhou, M. Zhao, X. Xu, J. Wang, and Y. Yao, "Distributed wireless communication system: A new architecture for future public wireless access," *IEEE Commun. Mag., vol.* 41, no. 3, pp 108-113, 2003.

[4] V. Tarokh, 11. Jafarkhani, and A. R. Calderbank, "Space-time block codes from orthogonal designs," *IEEE Trans. Inform. Theory, vol.* 45, pp. 14561467, July 1999.

[5] H. Shin and J. H. Lee, "Exact symbol error probability of orthogonal space-time block codes," in *Proc. IEEE Globecom '02*, Taipei, Taiwan, Nov. 17-21, pp. 1547-1552, 2002.

What is claimed is:

1. A device for allocating transmission power using a symbol error rate (SER) for orthogonal space-time block codes (OSTBC) in a wireless communication system, the device comprising:
    a plurality of antennas, wherein the antennas are distributed geographically;
    a receiver to select an optimum subset of the SER performance, using a preset power allocation to each of the available antenna subset combinations, and sending the selected subset to a transmitter; and
    a central processing unit to allocate power by applying an OSTBC symbol having a unit average power to the optimum subset from the receiver, wherein the preset power allocation to each of the antenna subsets includes a transmission power allocation using a water pouring algorithm or power allocation in proportion to a Nakagami fading parameter of each distributed antenna.

2. The device as claimed in claim 1, wherein the plurality of antennas is randomly distributed geographically.

3. The device as claimed in claim 1, wherein the plurality of antennas is independently linked to the central processing unit.

4. The device as claimed in claim 1, wherein when large-scale channel fading changes, the receiver updates the power allocation result and sends the result to the central processing unit.

5. A method of allocating transmission power using a symbol error rate (SER) for orthogonal space-time block codes (OSTBC) in a wireless communication system, the system including a plurality of antennas distributed geographically, the method comprising the steps of:

setting available antenna subset combinations by a receiver;

selecting an optimum subset of the SER performance using a preset power allocation to each of the antenna subsets, and sending, by the receiver, the selected subset to a transmitter; and allocating power by applying an OSTBC symbol having a unit average power to the optimum subset from the receiver, by a transmitter, wherein the preset power allocation to each of the antenna subsets includes a transmission power allocation using a water pouring algorithm or power allocation in proportion to a Nakagami fading parameter of each distributed antenna.

6. The method as claimed in claim 5, wherein, the step of selecting the optimum subset and sending the selected subset to the transmitter comprises the step of updating the power allocation result and sending the result to the central processing unit, when large-scale channel fading changes.

* * * * *